INVENTORS
PAUL H. CARTER
THOMAS E. MARION
RAYMOND L. MORSE

BY Albert J. Kramer
ATTORNEY

March 2, 1965 P. H. CARTER ET AL 3,171,367
MANUFACTURE OF NOVELTY ICE CREAM PRODUCTS
Filed Nov. 2, 1962 4 Sheets-Sheet 2

INVENTORS
PAUL H. CARTER
THOMAS E. MARION
RAYMOND L. MORSE

BY *Albert J. Kramer*
ATTORNEY

March 2, 1965  P. H. CARTER ET AL  3,171,367
MANUFACTURE OF NOVELTY ICE CREAM PRODUCTS
Filed Nov. 2, 1962  4 Sheets-Sheet 3

INVENTORS
PAUL H. CARTER
THOMAS E. MARION
RAYMOND L. MORSE

BY Albert J. Kramer
ATTORNEY

March 2, 1965 P. H. CARTER ET AL 3,171,367
MANUFACTURE OF NOVELTY ICE CREAM PRODUCTS
Filed Nov. 2, 1962 4 Sheets-Sheet 4

INVENTORS
PAUL H. CARTER
THOMAS E. MARION
RAYMOND L. MORSE

BY Albert J. Kramer
ATTORNEY

United States Patent Office 3,171,367
Patented Mar. 2, 1965

3,171,367
MANUFACTURE OF NOVELTY ICE CREAM
PRODUCTS
Paul H. Carter, Raymond L. Morse, and Thomas E.
Marion, all of 1200 S. Eutaw St., Baltimore, Md.
Filed Nov. 2, 1962, Ser. No. 235,081
1 Claim. (Cl. 107—54)

This is a continuation-in-part of our copending application for patent Ser. No. 815,883, filed May 26, 1959, now Patent No. 3,070,933.

The invention of this application relates to the manufacture of novelty ice cream products and it is more particularly concerned with such products which combine ice cream with other confectionary materials such as chocolate, nuts, syrups, ice cream cones, etc., wrapped in paper containers or jackets.

In our said copending application for patent Ser. No. 815,883, we have disclosed a machine for manufacturing such novelty ice cream products and by means of which paper jacketed ice cream cones are supported on a horizontal loading wheel that is rotated in relation to a series of confectionary dispensing units including chocolate, ice cream, ground nuts, etc. There is also disclosed in said application the method of providing a special type of novelty ice cream product by first placing in the ice cream cones a liquefied material before introducing the ice cream. As a result of this sequence of operations the liquefied material becomes hardened under the chilling effect of the ice cream.

Conventional ice cream cones, which are of a porous pastry product, before being placed in the paper jackets are coated with a liquefied chocolate which hardens upon cooling. The cooling is usually at room temperatures. This is conventionally accomplished by immersion of the cones in a bath of the liquid chocolate that is maintained in a liquid state which involves the steps of elevation of the temperature above the hardening point, then removal of and cooling of the cones to harden the chocolate after which the thus coated cones are placed in the paper jackets and fed to the filling machine. The coating of the cones prevents them from becoming soggy when the ice cream is deposited therein by the filling machine. The paper jackets keep the chocolate coating from contacting the hands and clothing of the consumer as well as the operator who feeds them to the filling machine. The hardening of the coating at room temperature requires a considerable period of time that tends to permit the coating to absorb into the cones and which, if it becomes sufficiently advanced, adversely affects the physical characteristics of the cones, such as crispness, for subsequent handling and consumption. Ideally, it is preferred that the liquid not become completely absorbed but only partially so to an extent just under the surface of the cones.

By operation of the filling machine in accordance with the teachings in said copending application it is possible to eliminate entirely the operation of coating the cones before placing them in the jackets and to achieve a product greatly superior in quality relative to that which results from the conventional method of providing these confectionary products. By depositing the coating material on the interior of the cones while they are on the filling machine and immediately before the ice cream is deposited therein, the ice cream chills and hardens the coating immediately, thereby preventing excessive absorption and protecting the cones from the ice cream. This procedure also has the advantage that the coating need be applied only to the interior of the cones which results in a saving of coating material, since the coating on the exterior by the conventional dipping methods is not only redundant and unnecessary for the purpose of protecting the cones from the ice cream but is actually undesirable because, among other things, it is subject to being contacted by the hands of the consumer as well as the machine operator and, hence, creates a problem of cleanliness. Further saving of the chocolate coating material is effected because it is not necessary to provide a large quantity in accordance with the method of the present invention since sufficient time is not permitted for the absorption of an unnecessary and excessive amount of chocolate into the pores of the cones.

The presence of the coating, in accordance with the conventional method, on the outside of the cones also presents the problem of oiling off, the oil being absorbed by the paper jackets from the coating material to produce an unsightly article as well as one which is likely to soil the fingers of the consumer while being held in and receiving warmth from the hands.

The chocolate coating in accordance with this invention may also be applied to the interior of a container without a pastry cone therein and when so applied forms a hard coating directly on the ice cream, whereupon the container may be peeled off leaving a chocolate coated ice cream bar.

These and still further objects, advantages and features of the invention will be more fully understood from the accompanying drawing in conjunction with the following description.

In the drawing.

Referring with more particularity to the drawing in which like numerals designate like parts, the filling machine illustrated in FIGS. 1 to 3 is essentially the same as that described in detail in said copending application Ser.

Figure 1:
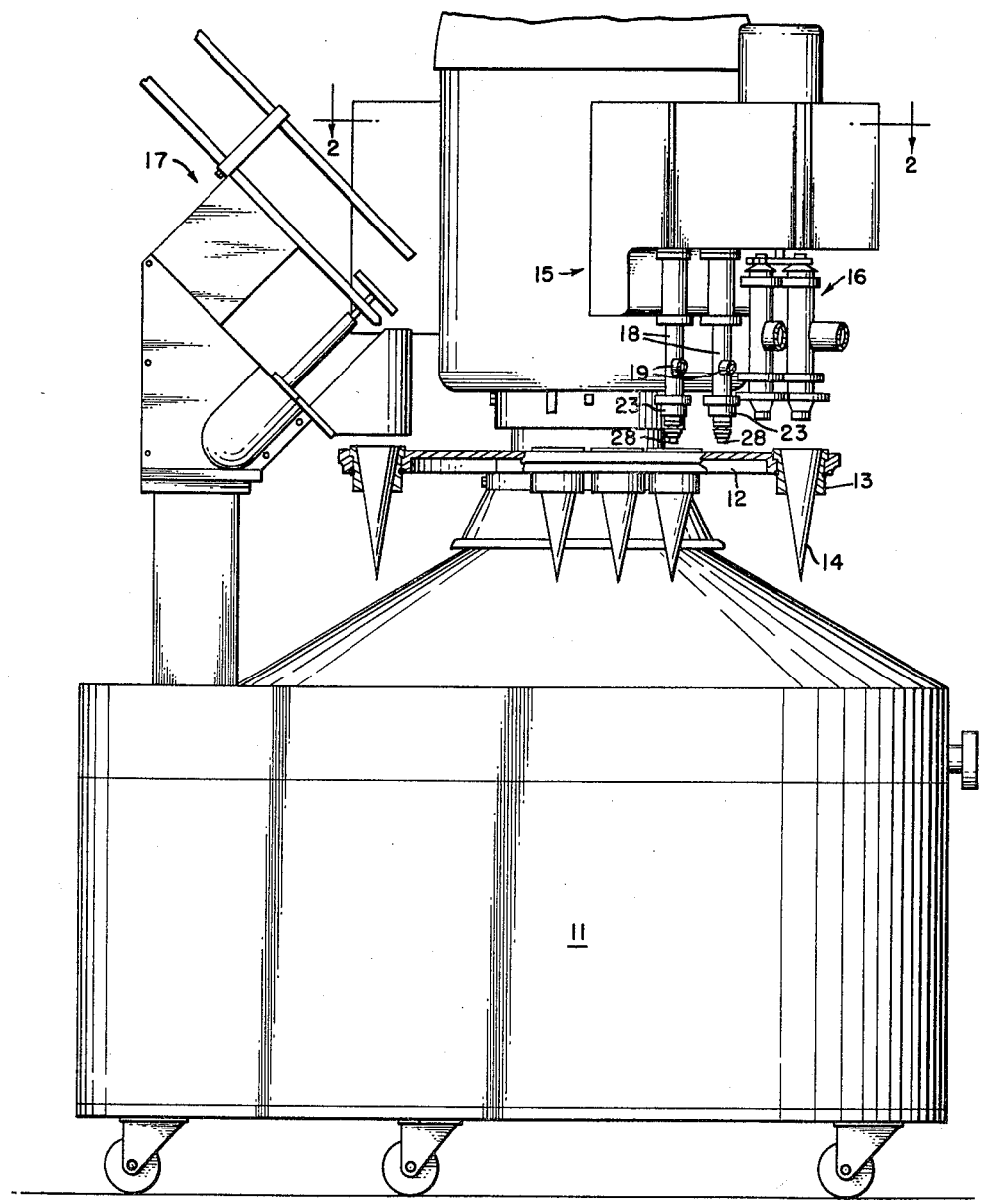
FIG. 1 is a side elevational view of a filling machine in accordance with this invention.
Figures 2, 3:
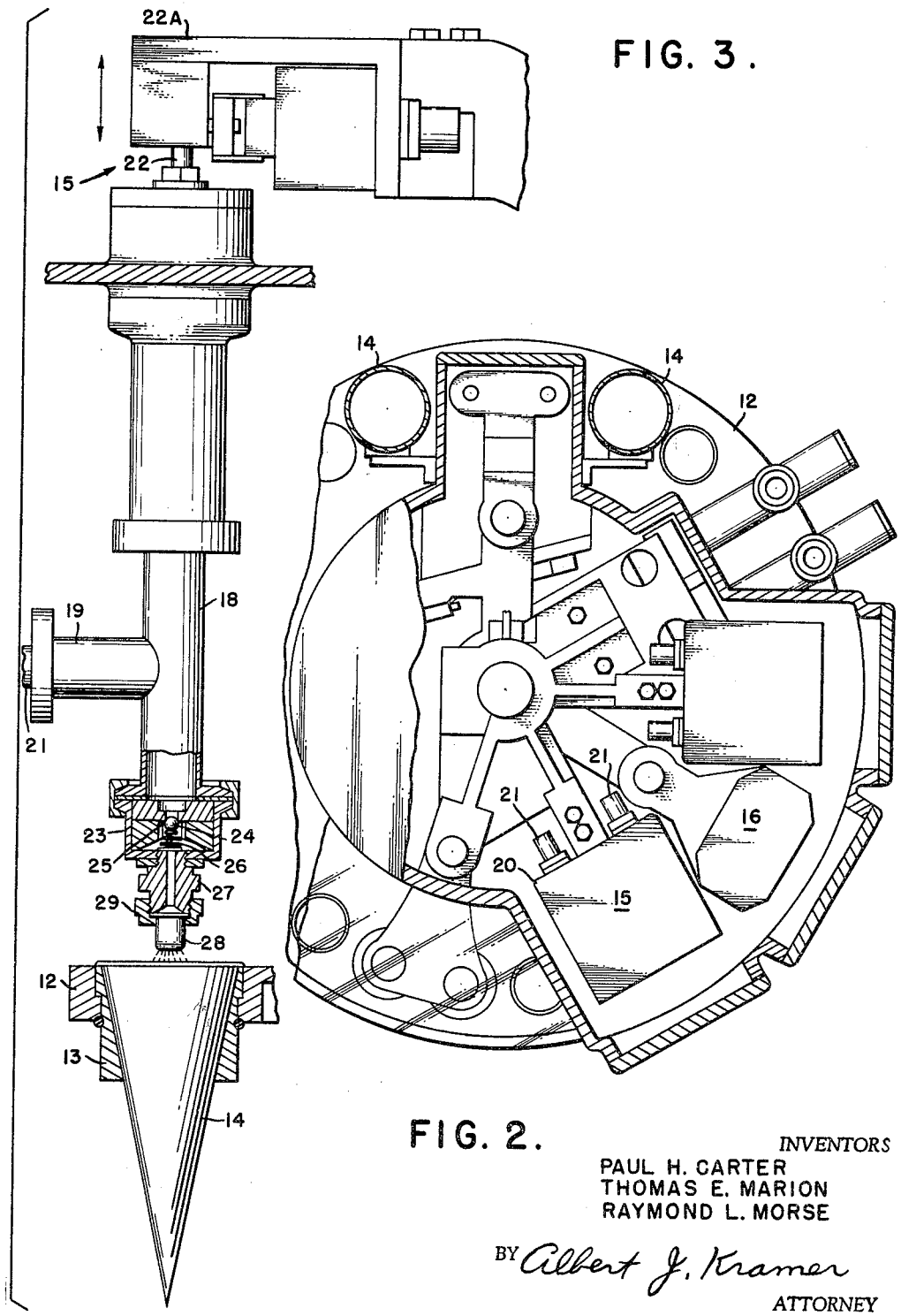
FIG. 2 is a plan sectional view along the line 2—2 of FIG. 1.
FIG. 3 is a fragmentary view of a portion of the machine showing in elevation and partly broken away the chocolate dispensing unit that precedes the ice cream dispensing unit.
Figure 4:
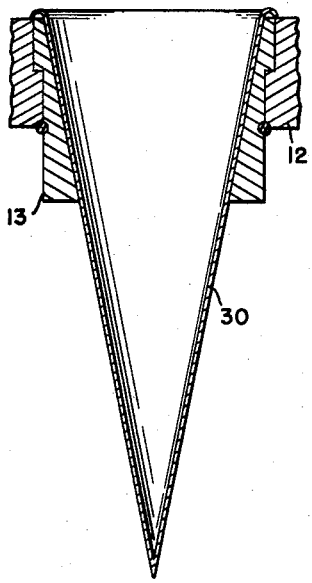
FIGS. 4, 5, 6, 7, 8 and 9 are a series of views diagrammatically illustrating the steps in the manufacture of a form of confectionary product in accordance with this invention.
Figure 5:
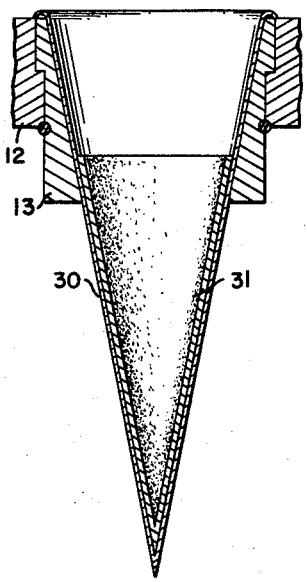

No. 815,883 to which reference is here made for a complete description thereof. For the purpose of this application, the machine may be regarded as comprising essentially a base structure 11, a horizontal loading wheel 12 having adapter members 13 for receiving receptacles, such as conical receptacles 14, and dispensing units for various items, such as the dispensing unit 15 for chocolate coated material (liquefied by heat), ice cream dispensing unit 16, and others which may be desired. The machine also includes a unit 17 for feeding the receptacles to the loading wheel, means (not shown) for intermittently rotating the wheel in synchronization with the dispensing units, and means for applying a sealed lid to the container after the confectionery material is deposited therein, all of which is disclosed in said copending application.

The dispensing units are each designed to provide twin outlets so that the deposit in the receptacles can be effected two at a time at each station. The entire machine is adaped to operate in this twin capacity for the purpose of increasing the rate of production.

The chocolate dispensing units 15 each comprise a vertical cylinder 18 which contains a reciprocating plunger (not shown) above an outlet pipe 19, said outlet pipe containing a check valve (not shown) and leading from a heated reservoir 20, through pipe 21. The plunger is actuated by a powered reciprocating arm 22A through a pin 22. The action of the plunger in the cylinder 18 in conjunction with the check valve, draws the liquefied chocolate into the cylinder from the pipe 19 on the upward stroke of the piston and on the downward stroke forces it through the bottom of the cylinder 18. The bottom of the cylinder is connected to a housing 23 containing a ball check valve that includes a ball 24, a ball seat 25 and ball spring 26 which urges the ball to closed position against the seat. The pressure of the spring is overcome by the liquid pressure on the down stroke of the piston in the cylinder 18. The bottom of the valve housing 23 has an outlet opening at its bottom to which a nipple 27 is removably attached by threads. A spray nozzle 28 is removably attached by a flange coupler 29 to the bottom of the nipple.

Figure 6:
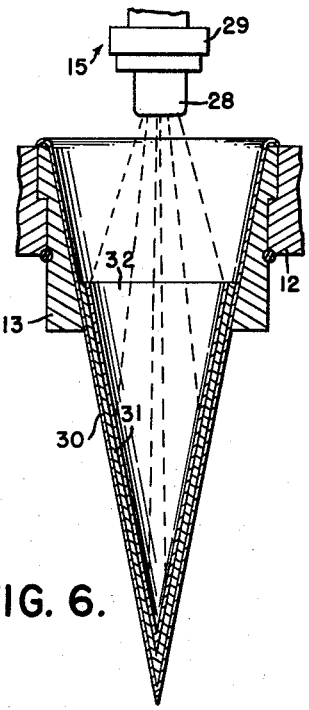
Figure 7:
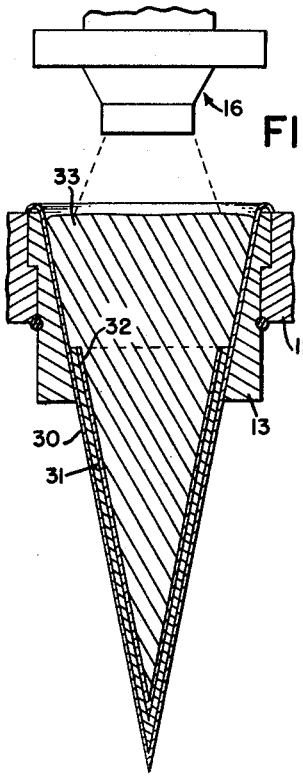

Referring with more particularity to FIGS. 4 to 9 which diiagrammatically illustrates a series of steps in the manufacture of a form of confectionery product, a receptacle, such as a conical jacket 30 of paper or other suitable material into which there is placed an empty pastry cone 31 is disposed on the loading wheel and carried by it to the various dispensing units of the machine intermittently. The first dispensing unit encountered is the chocolate coating dispenser 15 which is shown in FIG. 6. The spray from this dispenser covers the inside surface of the pastry cone with a layer of chocolate 32 the outside surface of the pastry cone being protected against the spray by the jacket 30. The next operation as shown in FIG. 7 results in the ice cream dispenser depositing a volume of chilled fluid ice cream 33 directly into the pastry cone 31 and in the space of the jacket 30 above the rim of the cone. This application of the cold material on the applied chocolate layer results in the chocolate becoming quickly hardened, usually in a fraction of a second. Between the time the chocolate is applied to the cone and the ice cream is deposited therein, a portion of the chocolate is absorbed into the walls of the cone but the application of the ice cream in point of time is such that the entire amount of the chocolate does not absorb, whereby the effect of the ice cream is to harden the chocolate at the surface of the cone and in the pores of the cone just under the surface. In other words, this operation is timed so as to harden the chocolate coating before it absorbs into the pores of the cone in an excessive amount to adversely affect the physical characteristics of the cone for the purpose for which it is intended. The hardening of the chocolate acts as a barrier to the penetration of the ice cream through the walls of the pastry cup. In actual practice good results have been obtained with ice cream at a temperature of about 15° to 25° F., usually 20° F., supplying the coating material at a temperature in the range of about 90° to 100° F., the hardening point of the coating material being about 75° to 80° F., usually about 78° F.

Figure 8:
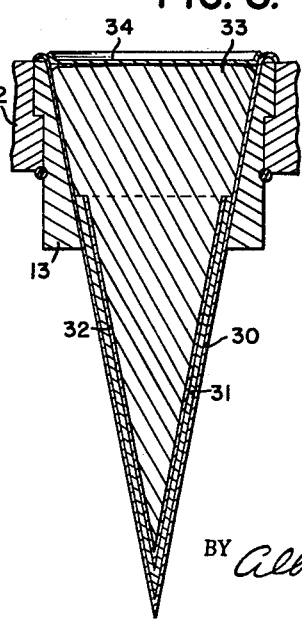
Figure 9:
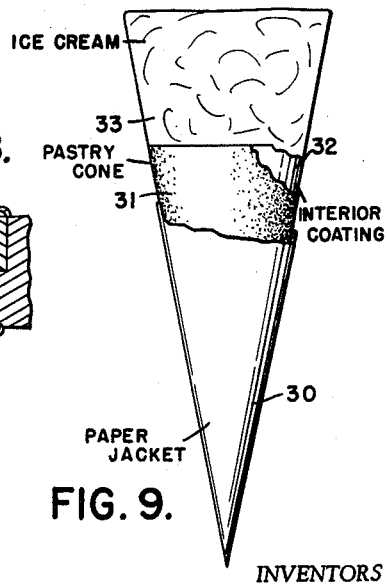
Figure 10:
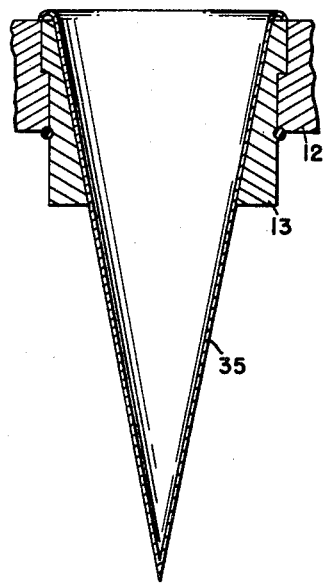
FIGS. 10, 11, 12, 13 and 14 are a series of views diagrammatically illustrating the steps in the manufacture of another form of confectionary material in accordance with this invention.
Figure 11:
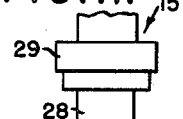
Figure 12:
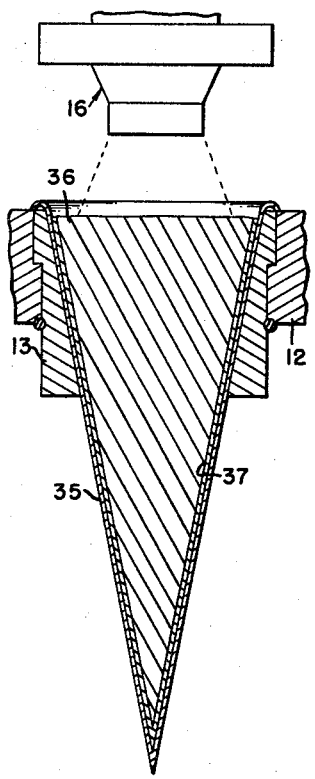
Figure 13:
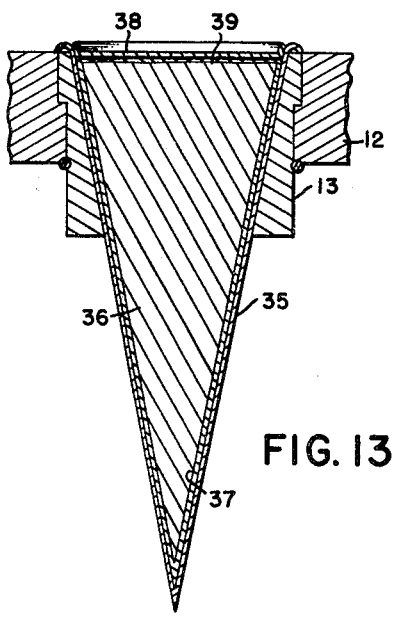
Figure 14:
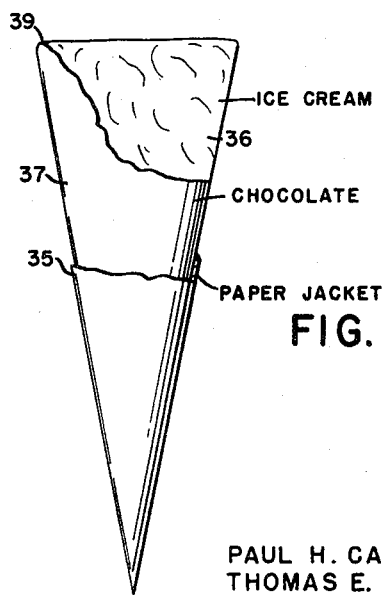

A lid 34 is then applied to the upper open end of the paper jacket as shown in FIG. 8 at a subsequent station of the machine (not shown), after which the thus completed product is removed from the machine and stored in a chilling room to harden the ice cream before being shipped for sale to the consuming public. These products are sold to the public and are usually consumed by progressively tearing the jacket 30 from the top to expose the product on the inside (see FIG. 9). As thus exposed the exterior surface of the pastry cone is substantially clear of chocolate coating so that contact thereof by the consumer's hands or clothing will not result in soiling, and yet the pastry cone is protected by the interior chocolate coating.

Another form of confectionary product that can be made with the machine is illustrated in FIGS. 10 to 14. In this case, no pastry cone is used. Instead a receptacle 35 alone of paper or other suitable material is used and the chocolate is sprayed directly on the interior surface of the receptacle. The ice cream 36 is then inserted (see FIG. 12) which causes the chocolate coating 37 to harden. The lid 38 is then applied (FIG. 13) to complete the product which is then stored in a chilling room to harden the ice cream. When the receptacle 35 is progressively removed from the top to expose the product the chocolate coating 37 adheres to the ice cream (see FIG. 14) and, in effect, a chocolate coated bar is thus provided similar to the well known "Eskimo Pies." A complete coating of chocolate may be provided for the ice cream by adding additional chocolate 39 to the top of the ice cream before putting the lid 38 in place.

It is to be understood that coatings other than chocolate may be used, the invention having been described with reference to chocolate for illustrative purposes only and and not for purposes of limitation. Such other coating materials as caramel, butterscotch, and others are well known in the art. Also, various toppings may be added to either form of the product, such as various syrups, crushed nuts, shredded coconut, et. Also, ices, sherbets, milk ice and other ice desserts may be used instead of or in conjunction with ice cream, the ice cream being referred to in the description above and the claims hereinafter for illustrative purposes only and not for purposes of limitation. Also, jackets and containers other than paper may be used and are deemed to be equivalent of paper such as thin-wall plastic material, polystyrene, polyethylene or other paper substitutes well known in the art. Also, glassware, parchment, metallic foil and other non-porous paper substitute material, as well as plastic coated paper, may be used.

Having thus described our invention, we claim:

The method of manufacturing a novelty ice cream product comprising supporting an open end conical paper jacket in a vertical position with its open end at the top; placing in the paper jacket while being supported in said vertical position a conical porous edible pastry container of a size and shape conforming to a portion of the paper jacket below a marginal annular area adjacent the top; spraying downwardly onto the pastry cone from a position directly above the supported jacket an edible liquid coating material, whereby the inner surface of the pastry container is exposed to the spray while the outer surface thereof is shielded from the spray by the presence of the jacket, said material having a hardening point and being in a liquefied state at a temperature above its hardening point; placing a quantity of fluid ice cream in the pastry container and jacket in direct contact with the coating material after the material absorbs partially into the walls of the pastry container, before it absorbs completely into the walls thereof, and while it is still in a fluid state; said ice cream being at a temperature below the hardening point of the material the quantity of said fluid ice cream being sufficient to fill the space in the paper jacket between the pastry container and an annular strip adjacent the upper edge of the jacket to lie against the inner surface of and conform to the shape of the paper jacket adjacent said space; then completely closing the upper open end of the paper jacket with a frusto-conically flanged circular disc in continuous contact with said annular strip while the jacket is in the vertical position to shield the contents thereof from the ambient air and subjecting the resulting product to a temperature below the freezing point of the ice cream therein.

References Cited by the Examiner

UNITED STATES PATENTS

| | | | |
|---|---|---|---|
| 1,708,252 | 4/29 | Berch | 99—88 |
| 1,775,597 | 9/30 | Myers. | |
| 1,778,479 | 10/30 | Baier | 99—137 |
| 2,925,347 | 2/60 | Cummings | 99—137 X |

FOREIGN PATENTS

| | | |
|---|---|---|
| 347,886 | 5/31 | Great Britain. |

ROBERT E. PULFREY, *Primary Examiner.*

J. D. BEIN, *Examiner.*